United States Patent
Brandenburg et al.

(10) Patent No.: US 10,122,660 B2
(45) Date of Patent: Nov. 6, 2018

(54) CONTEXTUAL MOBILE COMMUNICATION PLATFORM

(71) Applicant: MINDBODY, INC., San Luis Obispo, CA (US)

(72) Inventors: Chet I. Brandenburg, Pismo Beach, CA (US); Mario E. Ruiz, San Luis Obispo, CA (US)

(73) Assignee: MINDBODY, INC., San Luis Obispo, CA (US)

( * ) Notice: Subject to any disclaimer, the term of this patent is extended or adjusted under 35 U.S.C. 154(b) by 206 days.

(21) Appl. No.: 15/079,972

(22) Filed: Mar. 24, 2016

(65) Prior Publication Data

US 2016/0285802 A1 Sep. 29, 2016

Related U.S. Application Data

(60) Provisional application No. 62/139,073, filed on Mar. 27, 2015.

(51) Int. Cl.
*H04L 12/58* (2006.01)
*H04L 29/08* (2006.01)
*H04L 12/24* (2006.01)

(52) U.S. Cl.
CPC ............ *H04L 51/066* (2013.01); *H04L 41/22* (2013.01); *H04L 51/18* (2013.01); *H04L 67/327* (2013.01); *H04L 67/02* (2013.01)

(58) Field of Classification Search
CPC ....... H04L 51/12; H04L 72/66; H04L 51/066; H04L 67/327; H04L 41/22; H04L 51/18; H04L 67/02; G06Q 10/107
USPC .......................... 709/206, 203, 205, 204, 224
See application file for complete search history.

(56) References Cited

U.S. PATENT DOCUMENTS

| | | | | |
|---|---|---|---|---|
| 6,694,333 | B2 * | 2/2004 | Oldham | G06F 17/30887 |
| 6,819,932 | B2 * | 11/2004 | Allison | H04L 51/12 |
| | | | | 455/414.1 |
| 6,826,592 | B1 * | 11/2004 | Philyaw | G06F 9/44505 |
| | | | | 707/E17.112 |
| 7,145,875 | B2 * | 12/2006 | Allison | H04L 12/66 |
| | | | | 370/230.1 |
| 7,389,118 | B2 * | 6/2008 | Vesikivi | H04M 3/5322 |
| | | | | 455/418 |
| 7,634,528 | B2 * | 12/2009 | Horvitz | G05B 19/404 |
| | | | | 702/150 |

(Continued)

*Primary Examiner* — Frantz Coby
(74) *Attorney, Agent, or Firm* — Schwegman Lundberg & Woessner, P.A.

(57) ABSTRACT

Systems and methods for mobile communication platforms are described. In one embodiment, a method for distributing contextual information over a network to a first remote subscriber computer comprises receiving contextual information at a transmission server sent from a data source over a network, storing the remote subscriber's preferences relating to defined communication aspects, configuring the contextual information accordingly, and providing a configurable viewer application to the first remote subscriber for installation on the remote subscriber computer, the configurable viewer application including an interactive graphical user interface for viewing the configured contextual information. In a further aspect, the method includes sending a first encoded short URL for downloading the configurable application in a message to the first remote subscriber's computer.

15 Claims, 9 Drawing Sheets

(56) References Cited

U.S. PATENT DOCUMENTS

| | | | |
|---|---|---|---|
| 8,156,005 B2 * | 4/2012 | Vieri | G06Q 30/0241 |
| | | | 705/14.4 |
| 9,143,478 B2 * | 9/2015 | Ramaswamy | G06F 17/30876 |
| 2003/0105827 A1 * | 6/2003 | Tan | G06Q 10/107 |
| | | | 709/206 |
| 2007/0083642 A1 * | 4/2007 | Diedrich | H04L 43/00 |
| | | | 709/224 |
| 2010/0250740 A1 * | 9/2010 | Cao | G06F 9/54 |
| | | | 709/224 |
| 2010/0274671 A1 * | 10/2010 | Rainier | G06Q 30/00 |
| | | | 705/14.66 |

* cited by examiner

CONTEXTUAL MOBILE COMMUNICATION PLATFORM

CROSS-REFERENCE TO RELATED APPLICATIONS

This application claims the benefit of priority, under 35 U.S.C. Section 119(e), of U.S. Patent Application Ser. No. 62/139,073, filed on Mar. 27, 2015, which is herein incorporated by reference in its entirety.

BACKGROUND

Mobile and online communication is now ubiquitous, but the massive data content involved can lead to information overload and non-relevant messaging.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

"CARRIER SIGNAL" in this context refers to to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"MODULE" in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. ?A processor ma, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC)or any combination thereof. A processor may further be a multi-core processor having two or more independent processors (sometimes referred to as "cores") that may execute instructions contemporaneously.

Description

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2015, XXXX CORPORATION, All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Drawings

Figure 1:
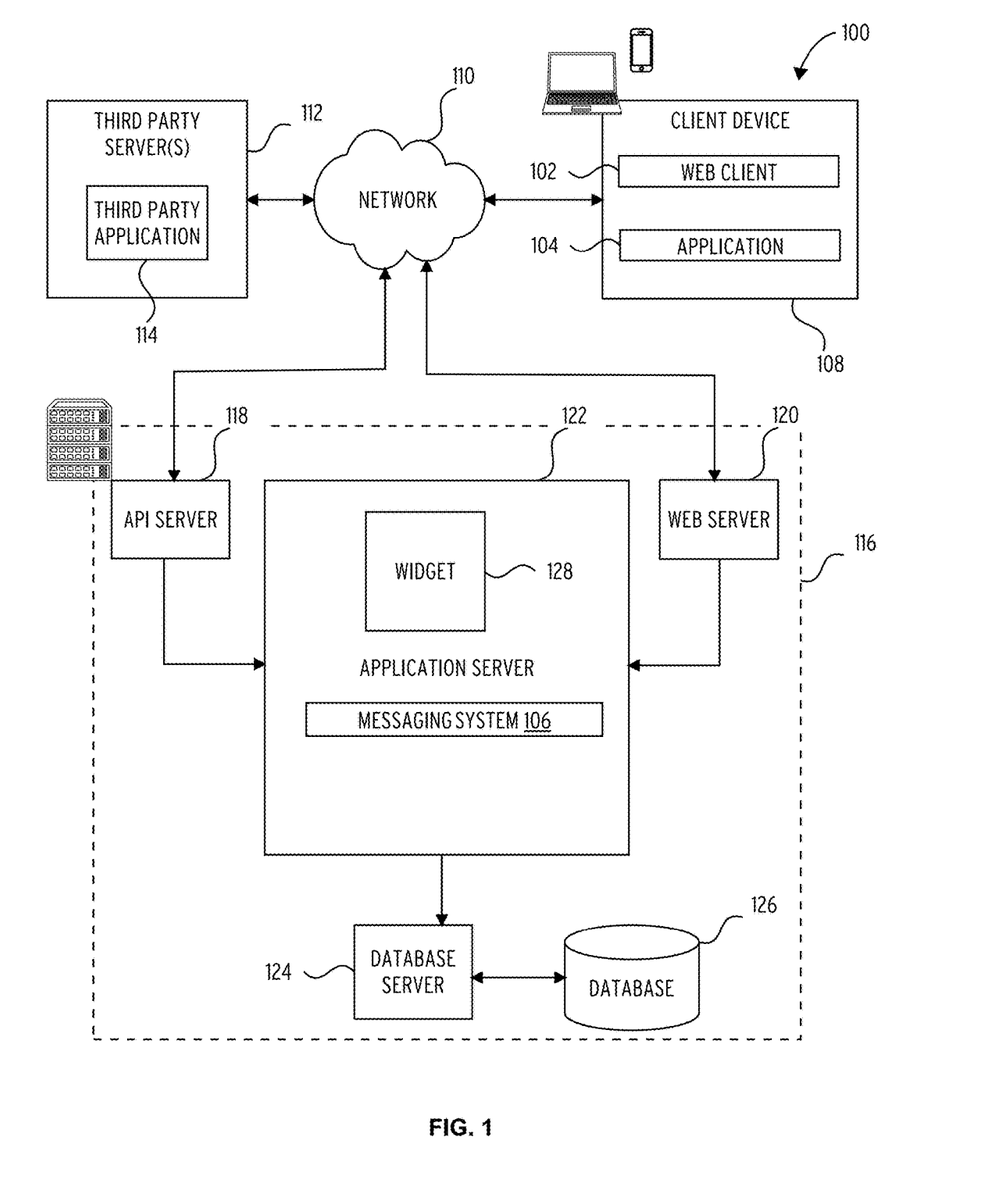
FIG. 1 is a block diagram illustrating a networked system, according to some example embodiments.

With reference to FIG. 1, an example embodiment of a high-level SaaS network architecture 100 is shown. A networked system 116 provides server-side functionality via a network 110 (e.g., the Internet or wide area network (WAN)) to a client device 108. A web client 102 and a programmatic client, in the example form of an application 104 are hosted and execute on the client device 108. The networked system 116 includes and application server 122, which in turn hosts a messaging system 106 that provides a number of functions and services to the application 104 that accesses the networked system 116. The application 104 also provides a number of interfaces described herein, which present output of the tracking and analysis operations to a user of the client device 108.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An Application Program Interface (API) server 118 and a web server 120 are coupled to, and provide programmatic and web interfaces respectively, to the application server 122. The application server 122 hosts a messaging system 106, which includes modules or applications. The modules or applications can perform any one or more of the methodologies discussed herein. The application server 122 is, in turn, shown to be coupled to a database server 124 that facilitates access to information storage repositories (e.g., a database 126). In an example embodiment, the database 126 includes storage devices that store information accessed and generated by the messaging system 106.

Additionally, a third party application 114, executing on a third party server 112, is shown as having programmatic access to the networked system 116 via the programmatic interface provided by the Application Program Interface (API) server 118. For example, the third party application 114, using information retrieved from the networked system 116, may support one or more features or functions on a website hosted by the third party.

Turning now specifically to the applications hosted by the client device 108, the web client 102 may access the various systems (e.g., messaging system 106) via the web interface supported by the web server 120. Similarly, the application 104 (e.g., an "app") accesses the various services and functions provided by the messaging system 106 via the programmatic interface provided by the Application Program Interface (API) server 118. The application 104 may, for example, an "app" executing on a client device 108, such as an iOS or Android OS application to enable user to access and input data on the networked system 116 in an off-line manner, and to perform batch-mode communications between the programmatic client application 104 and the networked system networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The messaging system 106 could also be implemented as a standalone software program, which do not necessarily have networking capabilities.

Figure 2:
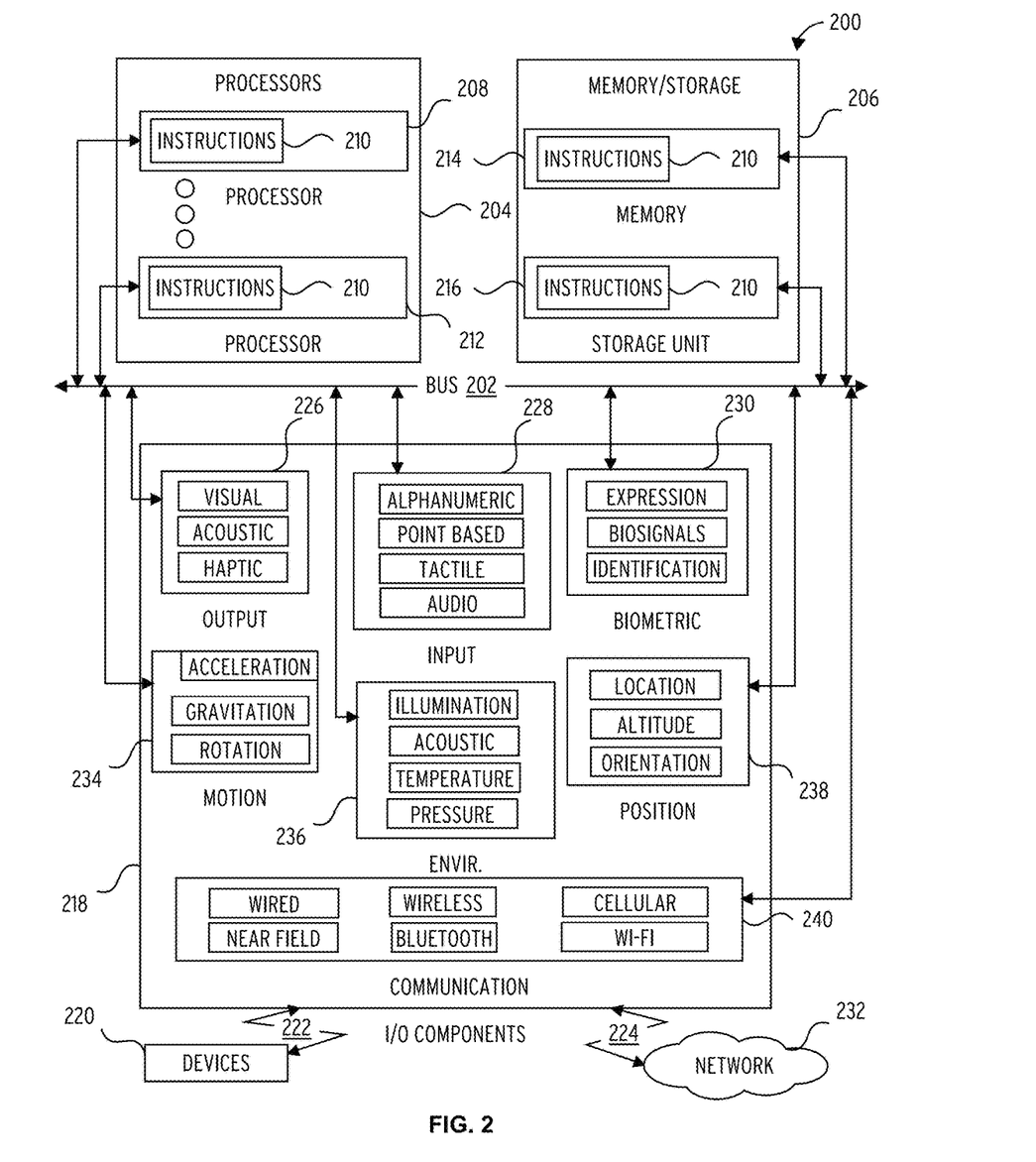
FIG. 2 is a block diagram illustrating components of a machine, according to some example embodiments, able to read instructions from a machine-readable medium (e.g., a machine-readable storage medium) and perform any one or more of the methodologies discussed herein.

FIG. 2 is a block diagram illustrating components of a machine 200, according to some example embodiments, able to read instructions from a machine-readable medium (e.g., a machine-readable storage medium) and perform any one or more of the methodologies discussed herein. Specifically, FIG. 2 shows a diagrammatic representation of the machine 200 in the example form of a computer system, within which instructions 210 (e.g., software, a program, an application, an applet, an app, or other executable code) for causing the machine 200 to perform any one or more of the methodologies discussed herein may be executed. As such, the instructions may be used to implement modules or components described herein. The instructions transform the general, non-programmed machine into a particular machine programmed to carry out the described and illustrated functions in the manner described. In alternative embodiments, the machine 200 operates as a standalone device or may be coupled (e.g., networked) to other machines. In a networked deployment, the machine 200 may operate in the capacity of a server machine or a client machine in a server-client network environment, or as a peer machine in a peer-to-peer (or distributed) network environment. The machine 200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 210, sequentially or otherwise, that specify actions to be taken by machine 200. Further, while only a single machine 200 is illustrated, the term "machine" shall also be taken to include a collection of machines that individually or jointly execute the instructions 210 to perform any one or more of the methodologies discussed herein.

The machine 200 may include processors 204, memory memory/storage 206, and I/O components 218, which may be configured to communicate with each other such as via a bus 202. The memory/storage 206 may include a memory 214, such as a main memory, or other memory storage, and a storage unit 216, both accessible to the processors 204 such as via the bus 202. The storage unit 216 and memory 214 store the instructions 210 embodying any one or more of the methodologies or functions described herein. The instructions 210 may also reside, completely or partially, within the memory 214, within the storage unit 216, within at least one of the processors 204 (e.g., within the processor's cache memory), or any suitable combination thereof, during execution thereof by the machine 200. Accordingly, the memory 214, the storage unit 216, and the memory of processors 204 are examples of machine-readable media.

The I/O components 218 may include a wide variety of components to receive input, provide output, produce output, transmit information, exchange information, capture measurements, and so on. The specific I/O components 218 that are included in a particular machine will depend on the type of machine. For example, portable machines such as mobile phones will likely include a touch input device or other such input mechanisms, while a headless server machine will likely not include such a touch input device. It will be appreciated that the I/O components 218 may include many other components that are not shown in FIG. 2. The I/O components 218 are grouped according to functionality merely for simplifying the following discussion and the grouping is in no way limiting. In various example embodiments, the I/O components 218 may include output components output components 226 and input components 228. The output components 226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 218 may include biometric components 230, motion components 234, environmental environment components 236, or position components 238 among a wide array of other components. For example, the biometric components 230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 234 may include acceleration sensor components (e.g., accelerometer), gravitation sensor components, rotation sensor components (e.g., gyroscope), and so forth. The environment components 236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 238 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 218 may include communication components 240 operable to couple the machine 200 to a network 232 or devices 220 via coupling 222 and coupling 224 respectively. For example, the communication components 240 may include a network interface component or other suitable device to interface with the network 232. In further examples, communication components 240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 220 may be another machine or any of a wide variety of peripheral devices (e.g., a peripheral device coupled via a Universal Serial Bus (USB)).

Moreover, the communication components 240 may detect identifiers or include components operable to detect identifiers. For example, the communication components processors communication components 240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 240, such as, location via Internet Protocol (IP) geo-location, location via Wi-Fi® signal triangulation, location via detecting a NFC beacon signal that may indicate a particular location, and so forth.

Software Architecture

Figure 3:
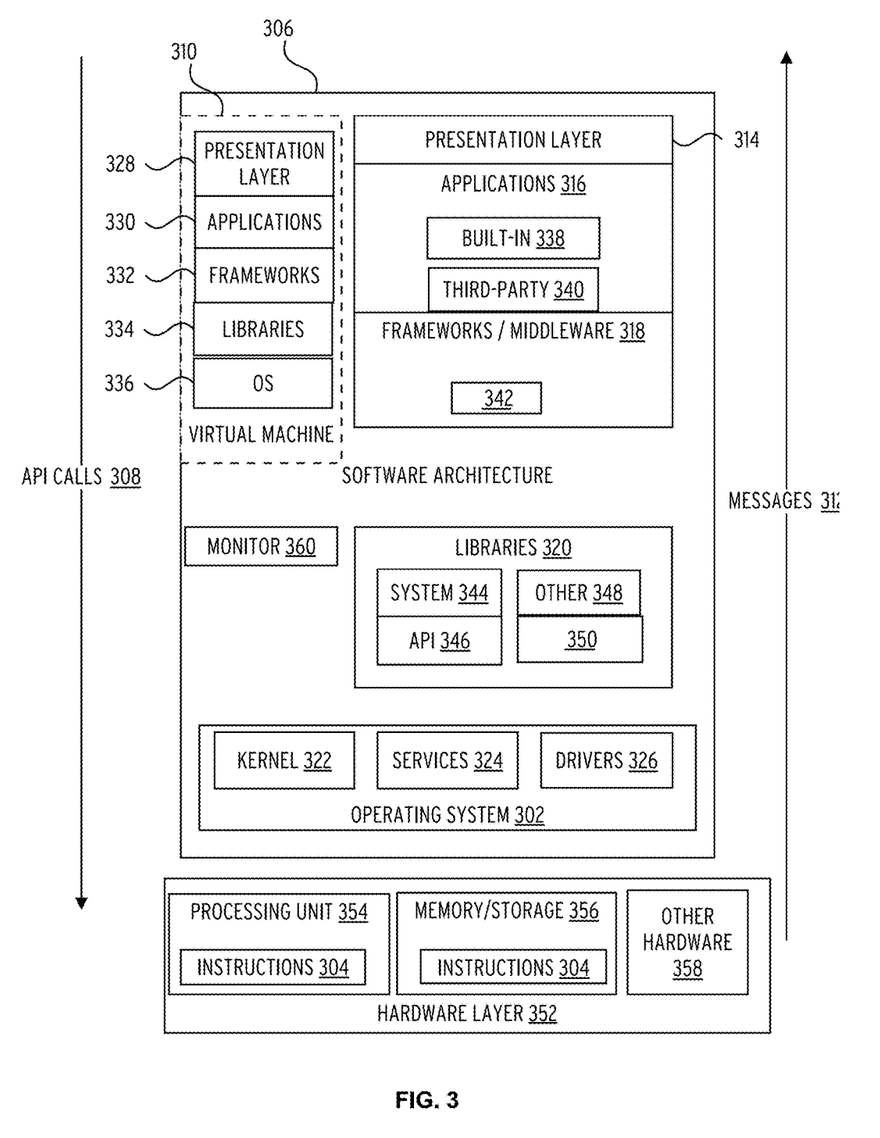
FIG. 3 is a block diagram illustrating a representative software architecture software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture and it will be appreciated that many other architectures may be implemented to facilitate the functionality described herein. The software architecture 306 may execute on hardware such as machine 200 of FIG. 2 that includes, among other things, processors 204, memory 214, and I/O components 218. A representative hardware layer 352 is illustrated and can represent, for example, the machine 200 of FIG. 2. The representative hardware layer 352 includes a processing unit 354 having associated executable instructions 304. Executable instructions 304 represent the executable instructions of the software architecture 306, including implementation of the methods, modules and so forth described herein. The hardware layer 352 also includes memory and/or storage modules memory/storage 356, which also have executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, applications 316 and a presentation layer 314. Operationally, the applications 316 and/or other components within the layers may invoke application programming interface (API) API calls 308 through the software stack and receive a response as in response to the API calls 308. The layers illustrated are representative in nature and not all software architectures have all layers. For example, some mobile or special purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324 and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than to interface directly with the underlying operating system 302 functionality (e.g., kernel 322, services 324 and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks frameworks/middleware 318 (also sometimes referred to as middleware) provide a higher-level common infrastructure that may be used by the applications 316 and/or other software components/modules. For example, the frameworks/middleware 318 may provide various graphic user interface (GUI) functions, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. Third-party applications 340 may include any an application developed using the ANDROID™ or IOS™ software development kit (SDK) by an entity other than the vendor of the particular platform, and may be mobile software running on a mobile operating system such as IOS™, ANDROID™ WINDOWS® Phone, or other mobile operating systems. The third-party applications 340 may invoke the API calls 308 provided by the mobile operating system (such as operating system 302) to facilitate functionality described herein.

The applications 316 may use built in operating system functions (e.g., kernel 322, services 324 and/or drivers 326), libraries 320, and frameworks/middleware 318 to create user interfaces to interact with users of the system. Alternatively, or additionally, in some systems interactions with a user may occur through a presentation layer, such as presentation layer 314. In these systems, the application/module "logic" can be separated from the aspects of the application/module that interact with a user.

Some software architectures use virtual machines. In the example of FIG. 3, this is illustrated by a virtual machine 310. The virtual machine 310 creates a software environment where applications/modules can execute as if they were executing on a hardware machine (such as the machine 200 of FIG. 2, for example). The virtual machine 310 is hosted by a host operating system (operating system (OS) 336 in FIG. 3) and typically, although not always, has a virtual machine monitor 360, which manages the operation of the virtual machine as well as the interface with the host operating system (i.e., operating system 302). A software architecture executes within the virtual machine 310 such as an operating system operating system (OS) 336, libraries 334, frameworks 332, applications 330 and/or presentation layer 328. These layers of software architecture executing within the virtual machine 310 can be the same as corresponding layers previously described or may be different.

In one aspect of the present inventive subject matter, a contextual mobile communication platform is provided. An overview 400 of such a platform is given in FIG. 4. The communication platform 400 can be enabled by the messaging system 106 (FIG. 1) or the machine 200 (FIG. 2). As indicated by the arrows 402, the platform can generate one or more encoded short URLs 404 that can be shared and marketed to drive downloads 406 and deliver a custom context-driven experience into mobile or web-based applications for users or consumers of wellness services, for example. An example wireless device or computer of a user is shown at 408 (108 in FIG. 1). Other types of client device 108 and 408 are possible.

Figure 4:
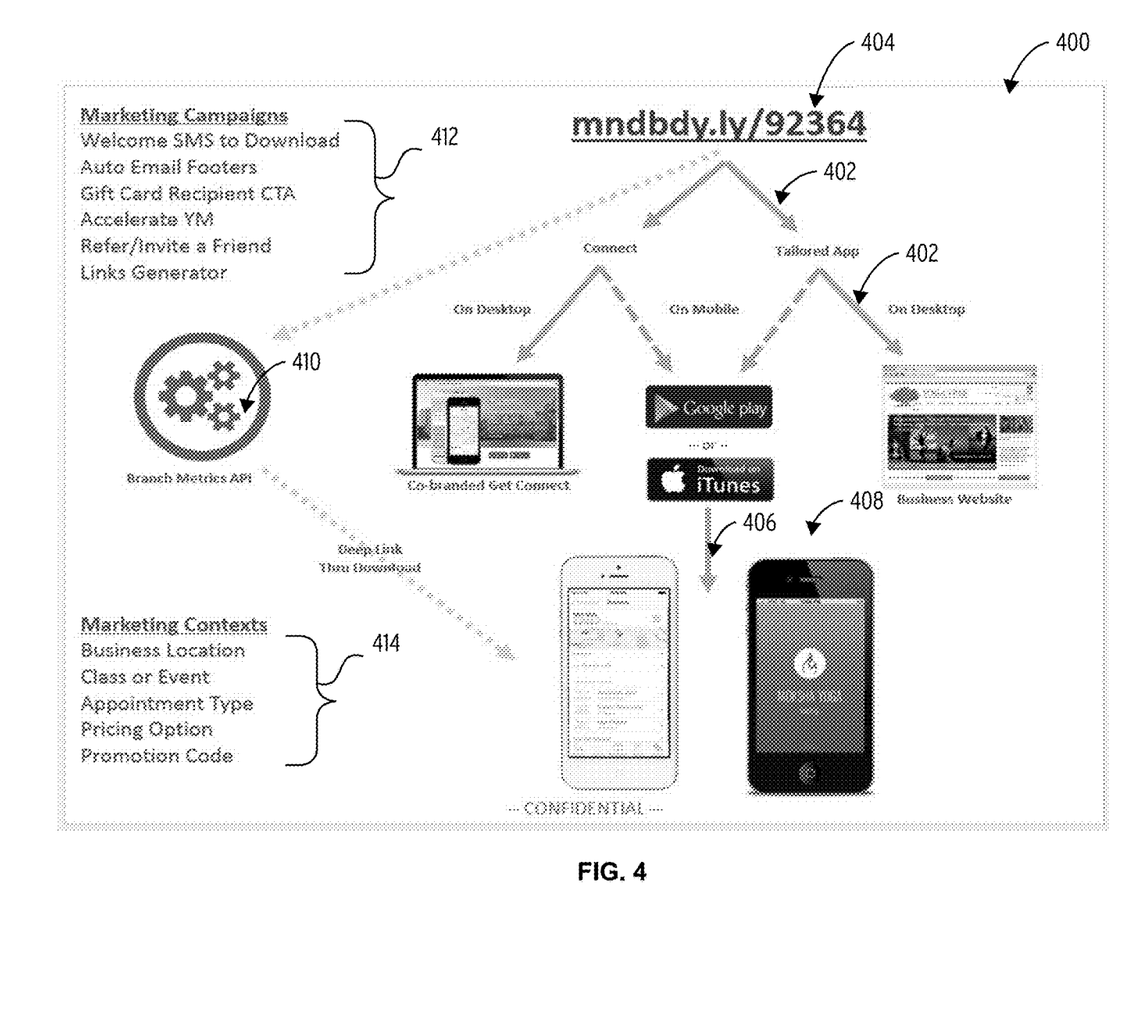
FIG. 4 shows an overview of a contextual mobile communication platform, according to an example embodiment. shows an overview of a contextual mobile marketing platform, according to an example embodiment.

Aspects of contextual messaging and configurable applications facilitated by the platform can include a welcome SMS message sent to the illustrated mobile device or a wearable device 408. An example text message includes an encoded short URL "mndbdy.ly/92364" for example shown at 404. Other configurable aspects can include, at 412, automatic email footers, gift card recipients, acceleration drives, refer- or invite-a-friend features, and a "links" generator, for example. Other aspects are possible. These aspects can be provided to a user though an interactive graphical user interface (GUI) and associated interface elements in a mobile or wearable device, computer desktops, and the like. Contexts within the platform can include, at 414, business location, class or event type, appointment type, pricing options, and promotion codes, for example. Metrics for all of these activities can be generated and monitored at 410 by one or more of the modules of the messaging system 106 enabling the communication platform 400.

In the descriptions that follow, reference is variously made to a "user". This term is intended to be a reference (without limitation) to a wellness provider or, for example, a human operator or receptionist working at the wellness provider. A user may be an employer or corporation, for example, or an HR administrator working at such an entity. The user may be a consumer or insurance company associated with a wellness provider or corporation. Other users are possible. In the following description, the example GUI's are touch sensitive. Slide-based or touch-based user navigation actions such as "swipes", "scrolls" and "taps" can cause the performance of operations within a processor or machine to which the GUI is connected. Other GUI's with clickable links or scrolling bars, for example, are possible.

Thus, features 402 of the contextual mobile marketing platform 400 enabled by the messaging system 106 are provided in a tailored or configurable application ("app") which can be downloaded 406 to a smart device 408 (portable electronic device, wearable device, smart watch, PDA, etc.) via an encoded, short URL 404 delivered in an SMS message. The app may include one or more graphical user interfaces (GUI's). The encoded, short URL 404 delivered in the SMS message dictates the context of the user's experience in the app, both persisting through download and installation of the app, as well as directly deep linking into the appropriate context when the app is already installed.

In one example, consider a new user who does not have such an app installed on a smart device. The platform allows the user to be engaged by sending the user an SMS thereby to receive a short URL with a single business (e.g. wellness provider, such as a yoga studio, or gym) location embedded as code in the URL. The URL takes the user to an app store to download the app. Upon downloading and installing the app, the code persists and that business (e.g. wellness provider) is automatically selected as a "favorite" for that user.

Furthermore, in the event that the now-engaged user signs up for a class (e.g. yoga class, aerobics session) at the "favorite" location and wants to invite a friend to that same class, a second (or further), short URL is provided that can be shared with the user's friend, for example again by SMS or by email. When the friend follows the URL, the link takes the friend directly into the app and into the workflow to sign up for that specific class.

In other aspects, the contextual mobile marketing platform 400 allows a user (wellness provider, for example) the opportunity to send out a welcome SMS that will allow the receiver (consumer) to download a wellness service application. The SMS includes an embedded link which has a unique code that identifies the wellness provider or the business location from which the link was directed. In order to initiate this technology, the wellness provider enables a "Send Welcome SMS" in an automatic email portion of their core application. Once enabled, the provider can send the welcome SMS to all new or prospective clients or users they may select as recipients. The welcome SMS includes a uniquely coded link, such as a "mndbdy.ly/code" link. In one embodiment, the link directs a recipient user to install an "engage user" application in an online media store (such as the iTunes Store or Google Play) based on, for example, an identified type of user mobile device. If the wellness provider does not have an "engage user" application, the mndbdy.ly application brings the user to an alternate "connect user" application in the online media store.

Figure 5:
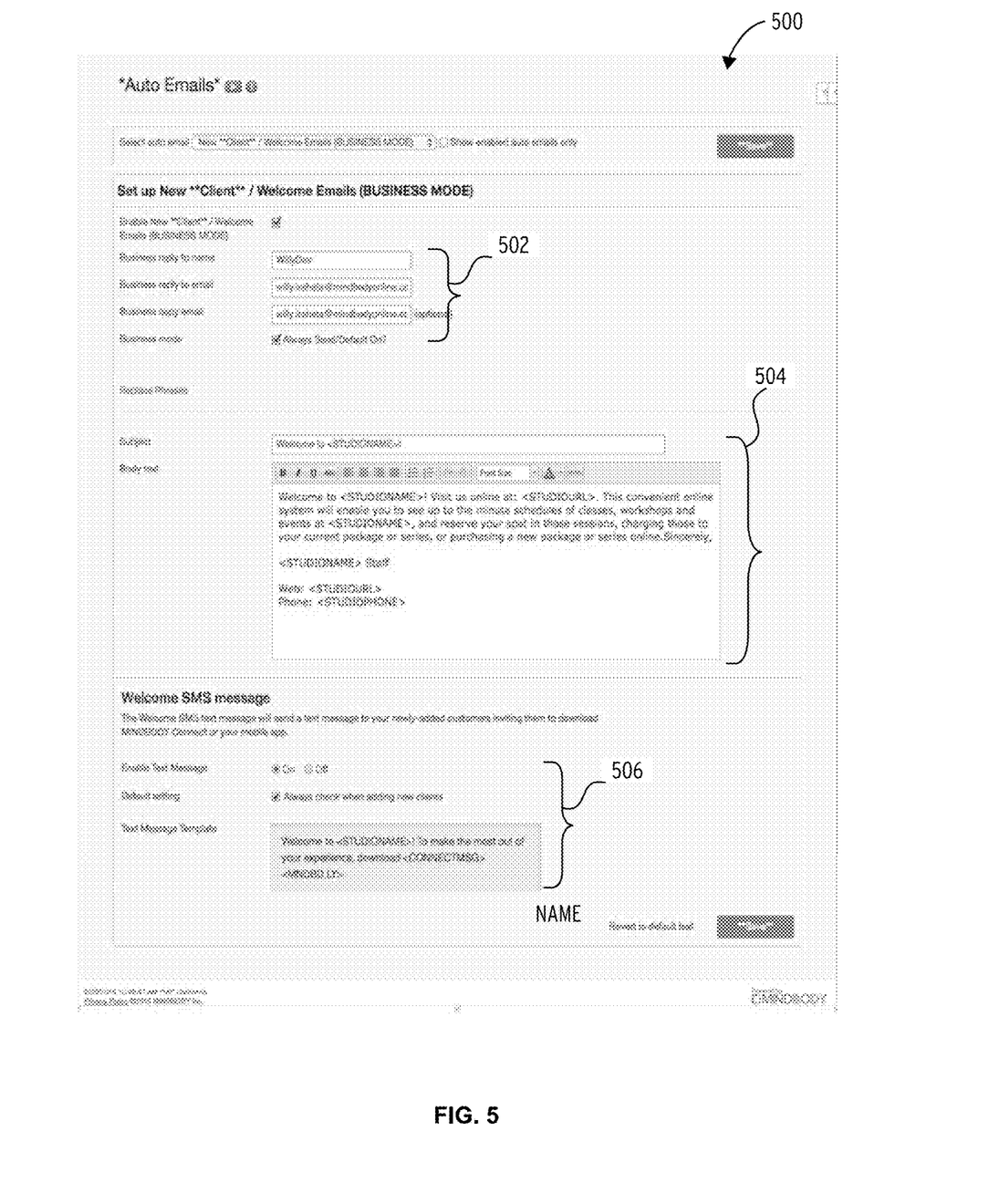
FIGS. 5-8 show an example GUIs, according to example embodiments.

A workflow in an example contextual mobile marketing platform 400 is now described. FIG. 5 shows a GUI 500 for setting up automatic email and SMS messages. A first upper portion of the GUI 500 includes a number of user interface elements 502 and 504 and data entry fields, as shown. In a second, lower portion of the GUI 500 a user (for example, a wellness provider) can through user interface elements 506 configure, enable or disable a "send welcome SMS" feature in an automatic SMS message configuration. An SMS with encoded link can be sent to existing or potential clients. In this way, when the user wishes to add a client into a database or hosted application, the user can choose to send the welcome SMS to the newly added client.

Figure 6:
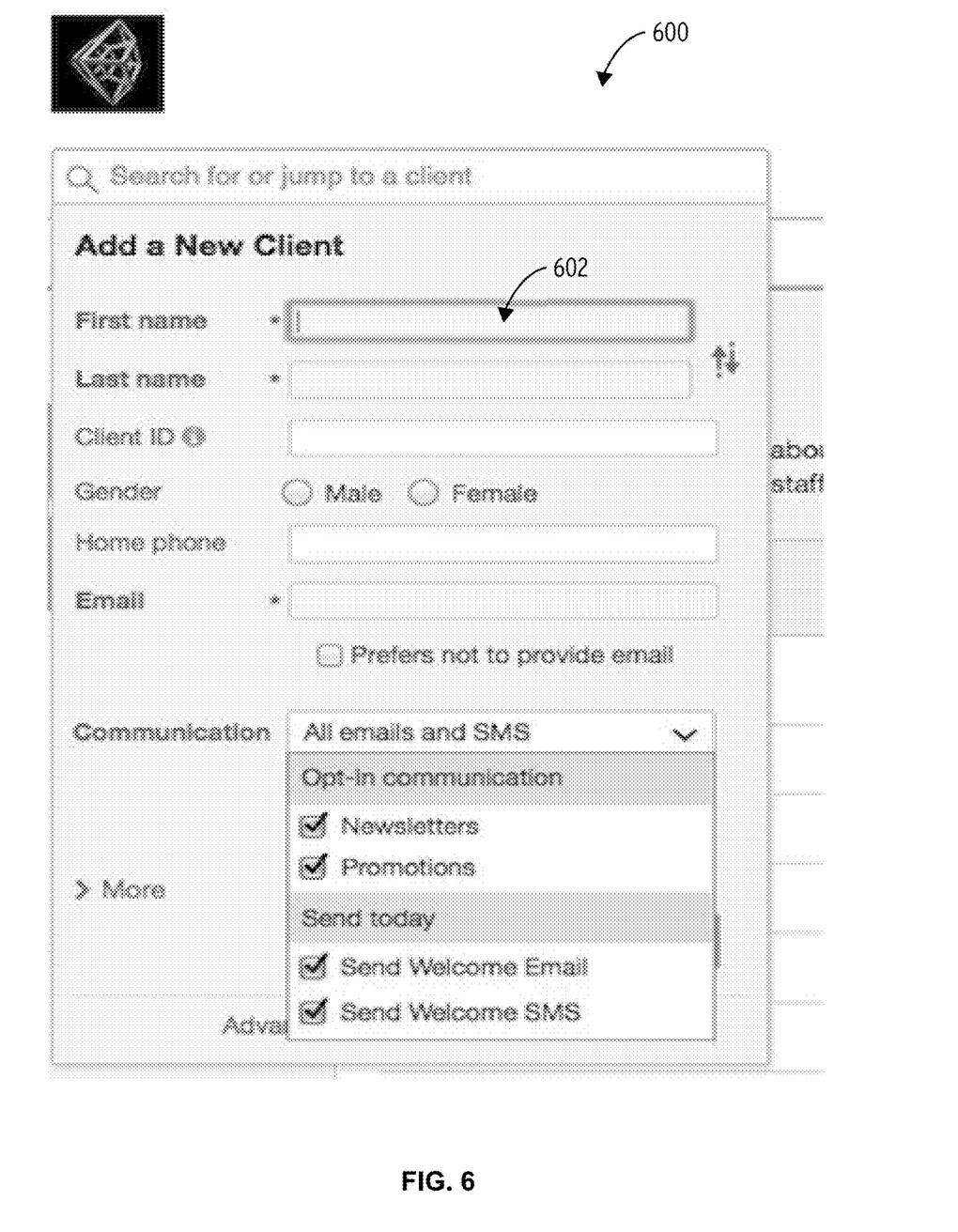
Figure 7:
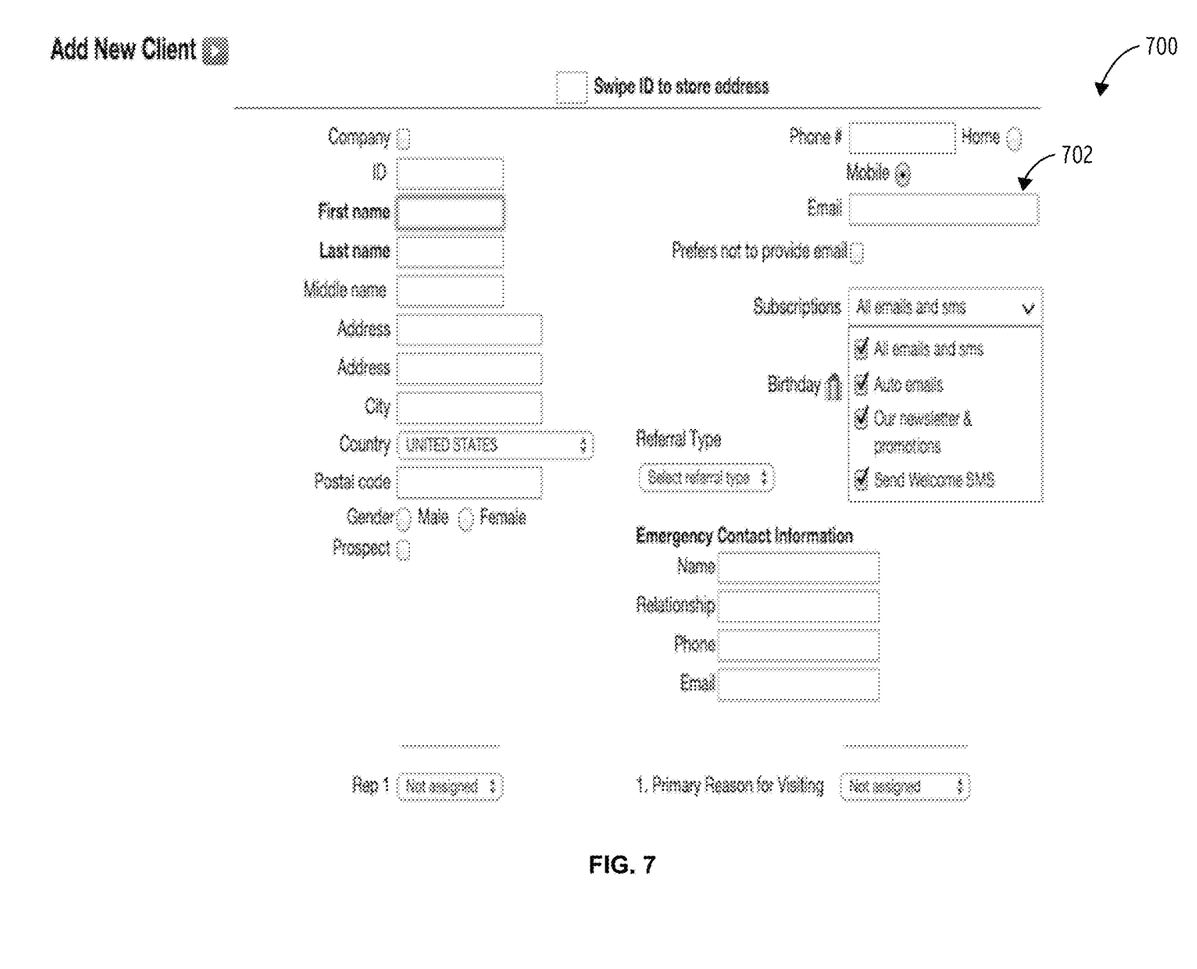
Figure 8:
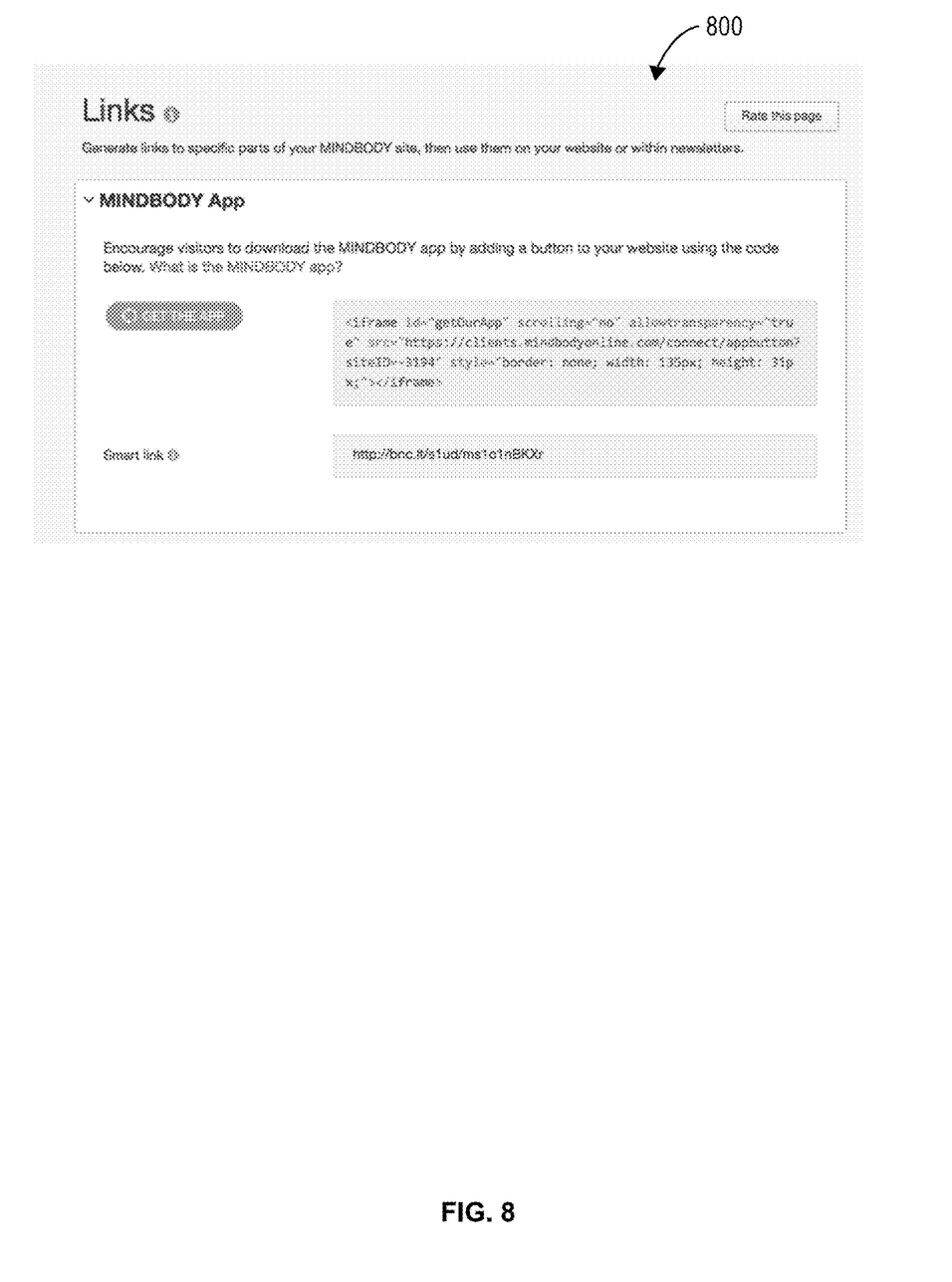

Example GUI's 600 and 700 for setting up a new client and configuring communication preferences are shown in FIGS. 6 and 7. Many GUI data entry fields for configuring communications are shown. Two example fields are numbered 602 and 702, respectively. Once a new user (a client for example) is safely added into a client database, a welcome SMS with encoded link can be sent to the client's mobile device in accordance with the communication configuration thus established. In FIG. 8, another GUI 800 allows users to generate their own link to use in their own purposes that still provides the context of deep linking into a studio-specific experience in the app.

Figure 9:
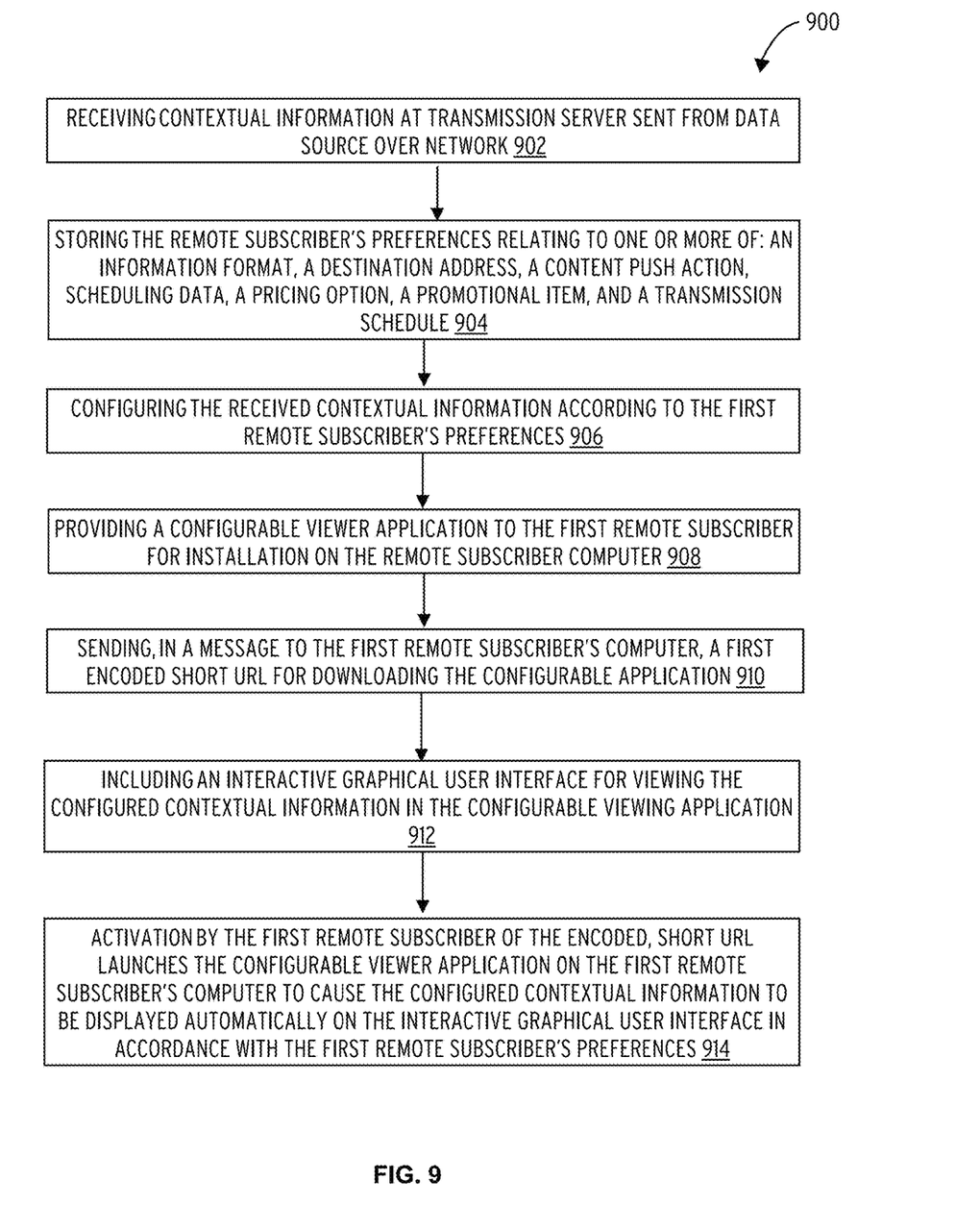
FIG. 9 illustrates a method for distributing contextual information over a network to a first remote subscriber computer in accordance with one embodiment.

Thus, in some embodiments, a messaging method 900 for distributing contextual information over a network to a first remote subscriber computer may include, at 902, receiving contextual information at a transmission server sent from a data source over a network.

In some embodiments, the transmission server may include, a processor and memory that stores, at 904, the remote subscriber's preferences relating to one or more of: an information format, a destination address, a content push action, scheduling data, a pricing option, a promotional item, and a transmission schedule.

In some embodiments, the processor configures, at 906, the received contextual information according to the first remote subscriber's preferences.

In some embodiments, the messaging method 900 includes, at 908, providing a configurable viewer application to the first remote subscriber for installation on the remote subscriber computer; and sending, at 910, in a message to the first remote subscriber's computer, a first encoded short URL for downloading the configurable application.

In some embodiments, the configurable viewer application may include, at 912, an interactive graphical user interface for viewing the configured contextual information.

In some embodiments, activation, at 414, by the first remote subscriber of the encoded, short URL launches the configurable viewer application on the first remote subscriber's computer to cause the configured contextual information to be displayed automatically on the interactive graphical user interface in accordance with the first remote subscriber's preferences.

In some embodiments, such a method may further include receiving a first remote subscriber preference via the interactive graphical user interface.

In some embodiments, such a method may further include sending the encoded short URL in an SMS message or email to the first remote subscriber's computer over a wireless network via a wireless device associated with the first remote subscriber.

In some embodiments, such a method may further comprise including in the configured contextual information, a second encoded short URL for transmission to a second remote subscriber's computer.

In some embodiments, code included in the first encoded short URL persists on launch of the configurable application to configure content displayed in the graphical user interface.

Thus, systems and methods for messaging systems and communication platforms have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Description, with each claim standing on its own as a separate embodiment.

What is claimed is:

1. A messaging method for distributing contextual information over a network to a first remote subscriber's computer, the method comprising:
    receiving by a transmission server the first remote subscriber's contextual information over the network,
        the transmission server comprising a processor and memory that stores the first remote subscriber's contextual information, wherein the first remote subscriber's contextual information includes at least one of:
        a destination address, scheduling data, a pricing option, or a promotional item;
    configuring by the transmission server a configurable viewer application to include the first remote subscriber's contextual information, wherein configuring the configurable viewer application includes configuring an interactive graphical user interface included in the configurable viewer application to automatically display the first remote subscriber's contextual information; and
    sending, in a message to the first remote subscriber's computer, a first encoded short URL for downloading the configurable viewer application on the first remote subscriber's computer,
        wherein activation by the first remote subscriber of the first encoded short URL directs the first remote subscriber to download the configurable viewer application on the first remote subscriber's computer,
        wherein, once installed, launching the configurable viewer application causes the first remote subscriber's contextual information to be displayed automatically on the interactive graphical user interface.

2. The method of claim 1, further comprising: receiving first remote subscriber's preferences via the interactive graphical user interface, wherein the first remote subscriber's preferences includes at least one of: an information format, a content push action, or a transmission schedule.

3. The method of claim 1, further comprising: sending the first encoded short URL in an SMS message or email to the first remote subscriber's computer over a wireless network via a wireless device associated with the first remote subscriber.

4. The method of claim 1 further comprising: sending, in a message to a second remote subscriber's computer, a second encoded short URL, wherein the second encoded short URL for downloading the configurable viewer application on the second remote subscriber's computer, wherein once installed, launching the configurable viewer application on the second remote subscriber's computer causes the first remote subscriber's contextual information to be displayed automatically on the interactive graphical user interface.

5. The method of claim 1, wherein code included in the first encoded short URL persists on launch of the configurable viewer application to configure content displayed in the interactive graphical user interface.

6. A computing apparatus for distributing contextual information over a network to a first remote subscriber's computer, the computing apparatus comprising:
    a processor; and
    a memory storing instructions that, when executed by the processor, configure the computing apparatus to:
    receive the first remote subscriber's contextual information over the network and store the first remote subscriber's contextual information includes at least one of: a destination address, schedule data, a pricing option, or a promotional item,
    configure a configurable viewer application to include the first remote subscriber's contextual information, wherein configuring the configurable viewer application includes configuring an interactive graphical user interface included in the configurable viewer application to automatically display the first remote subscriber's contextual information; and
    send, in a message to the first remote subscriber's computer, a first encoded short URL for downloading the configurable viewer application on the first remote subscriber's computer,
        wherein activation by the first remote subscriber of the first encoded short URL directs the first remote subscriber to download the configurable viewer application on the first remote subscriber's computer,
        wherein, once installed, launching the configurable viewer application causes the first remote subscriber's contextual information to be displayed automatically on the interactive graphical user interface.

7. The computing apparatus of claim 6, wherein the instructions further configure the computing apparatus to receive first remote subscriber's preference via the interactive graphical user interface, wherein the first remote subscriber's preferences include at least one of: an information format, a content push action, or a transmission schedule.

8. The computing apparatus of claim 6, wherein the instructions further configure the computing apparatus to send the first encoded short URL in an SMS message or email to the first remote subscriber's computer over a wireless network via a wireless device associated with the first remote subscriber.

9. The computing apparatus of claim 6 wherein the instructions further configure the computing apparatus to send, in a message to a second remote subscriber's computer, a second encoded short URL, wherein the second encoded short URL for downloading the configurable viewer application on the second remote subscriber's computer, wherein once installed, launching the configurable viewer application on the second remote subscriber's computer causes the first remote subscriber's contextual information to be displayed automatically on the interactive graphical user interface.

10. The computing apparatus of claim 6, wherein code included in the first encoded short URL persists on launch of the configurable viewer application to configure content displayed in the interactive graphical user interface.

11. A non-transitory machine-readable storage medium for distributing contextual information over a network to a first remote subscriber's computer, the machine-readable storage medium including instructions that when executed by a machine, cause the machine to:

receive the first remote subscriber's contextual information over the network and store the first remote subscriber's contextual information including at least one of: a destination address, schedule data, a pricing option, or a promotional item;

configure a configurable viewer application to include the first remote subscriber's contextual information, wherein configuring the configurable viewer application includes configuring an interactive graphical user interface included in the configurable viewer application to automatically display the first remote subscriber's contextual information; and send, in a message to the first remote subscriber's computer, a first encoded short URL for downloading the configurable viewer application on the first remote subscriber's computer;

wherein activation by the first remote subscriber of the first encoded short URL directs the first remote subscriber to download the configurable viewer application on the first remote subscriber's computer, wherein, once installed, launching the configurable viewer application causes the first remote subscriber's contextual information to be displayed automatically on the interactive graphical user interface.

12. The machine-readable storage medium of claim 11, wherein the instructions further configure the machine to receive first remote subscriber's preferences via the interactive graphical user interface, wherein the first remote subscriber's preferences include at least one of: an information format, a content push action, or a transmission schedule.

13. The machine-readable storage medium of claim 11, wherein the instructions further configure the machine to send the first encoded short URL in an SMS message or email to the first remote subscriber's computer over a wireless network via a wireless device associated with the first remote subscriber.

14. The machine-readable storage medium of claim 11 wherein the instructions further configure the machine to send, in a message to a second remote subscriber's computer, a second encoded short URL, wherein the second encoded short URL for downloading the configurable viewer application on the second remote subscriber's computer, wherein once installed, launching the configurable viewer application on the second remote subscriber's computer causes the first remote subscriber's contextual information to be displayed automatically on the interactive graphical user interface.

15. The machine-readable storage medium of claim 11, wherein code included in the first encoded short URL persists on launch of the configurable viewer application to configure content displayed in the interactive graphical user interface.

* * * * *

UNITED STATES PATENT AND TRADEMARK OFFICE
CERTIFICATE OF CORRECTION

| | |
|---|---|
| PATENT NO. | : 10,122,660 B2 |
| APPLICATION NO. | : 15/079972 |
| DATED | : November 6, 2018 |
| INVENTOR(S) | : Brandenburg et al. |

Page 1 of 1

It is certified that error appears in the above-identified patent and that said Letters Patent is hereby corrected as shown below:

In the Specification

In Column 1, Line 49, delete "to to" and insert --to-- therefor

In Column 6, Lines 40-41, delete "memory memory/storage" and insert --memory/storage-- therefor In Column 7, Lines 3-4, after "include", delete "output components"

In Column 9, Line 34, delete "The frameworks" and insert --The-- therefor

Signed and Sealed this
Twenty-first Day of April, 2020

Andrei Iancu
*Director of the United States Patent and Trademark Office*